United States Patent
Farrand et al.

(10) Patent No.: US 8,515,021 B2
(45) Date of Patent: Aug. 20, 2013

(54) SYSTEM AND METHOD FOR PROVIDING PERSONALIZED REVERSE 911 SERVICE

(75) Inventors: Toby Farrand, Palo Alto, CA (US); Todd Krein, San Jose, CA (US); Jeff Peck, Los Altos, CA (US)

(73) Assignee: Ooma, Inc., Palo Alto, CA (US)

( * ) Notice: Subject to any disclaimer, the term of this patent is extended or adjusted under 35 U.S.C. 154(b) by 1066 days.

(21) Appl. No.: 12/072,381

(22) Filed: Feb. 25, 2008

(65) Prior Publication Data

US 2009/0213999 A1    Aug. 27, 2009

(51) Int. Cl.
*H04M 11/04* (2006.01)

(52) U.S. Cl.
USPC .......................................................... 379/48

(58) Field of Classification Search
USPC .......................................................... 379/48
See application file for complete search history.

(56) References Cited

U.S. PATENT DOCUMENTS

| | | | |
|---|---|---|---|
| 5,425,085 A | 6/1995 | Weinberger et al. | |
| 5,519,769 A | 5/1996 | Weinberger et al. | |
| 5,796,736 A | 8/1998 | Suzuki | |
| 6,023,724 A | 2/2000 | Bhatia et al. | |
| 6,377,938 B1 | 4/2002 | Block et al. | |
| 6,487,197 B1 | 11/2002 | Elliott | |
| 6,615,264 B1 | 9/2003 | Stoltz et al. | |
| 6,697,358 B2 | 2/2004 | Bernstein | |
| 6,714,545 B1 | 3/2004 | Hugenberg et al. | |
| 6,778,528 B1 | 8/2004 | Blair et al. | |
| 6,934,258 B1 | 8/2005 | Smith et al. | |
| 7,124,506 B2 | 10/2006 | Yamanashi et al. | |
| 7,127,043 B2 | 10/2006 | Morris | |
| 7,127,506 B1 | 10/2006 | Schmidt et al. | |
| 7,342,925 B2 | 3/2008 | Cherchali et al. | |
| 7,376,124 B2 | 5/2008 | Lee et al. | |
| 7,394,803 B1 | 7/2008 | Petit-Huguenin et al. | |
| 2002/0016718 A1 | 2/2002 | Rothschild et al. | |
| 2002/0035556 A1 | 3/2002 | Shah et al. | |
| 2002/0037750 A1* | 3/2002 | Hussain et al. | 455/564 |
| 2002/0038167 A1 | 3/2002 | Chirnomas | |
| 2003/0058844 A1 | 3/2003 | Sojka et al. | |
| 2003/0189928 A1 | 10/2003 | Xiong | |
| 2004/0010472 A1 | 1/2004 | Hilby et al. | |
| 2004/0010569 A1 | 1/2004 | Thomas et al. | |
| 2004/0059821 A1 | 3/2004 | Tang et al. | |
| 2004/0090968 A1 | 5/2004 | Kimber et al. | |
| 2004/0105444 A1 | 6/2004 | Korotin et al. | |
| 2004/0160956 A1 | 8/2004 | Hardy et al. | |
| 2005/0027887 A1 | 2/2005 | Zimler et al. | |
| 2005/0036590 A1 | 2/2005 | Pearson et al. | |
| 2005/0074114 A1 | 4/2005 | Fotta et al. | |
| 2005/0078681 A1 | 4/2005 | Sanuki et al. | |
| 2005/0097222 A1 | 5/2005 | Jiang et al. | |
| 2005/0105708 A1 | 5/2005 | Kouchri et al. | |
| 2005/0141485 A1 | 6/2005 | Miyajima et al. | |
| 2005/0169247 A1 | 8/2005 | Chen | |
| 2005/0238034 A1 | 10/2005 | Gillespie et al. | |
| 2005/0259637 A1 | 11/2005 | Chu et al. | |

(Continued)

*Primary Examiner* — Alexander Jamal
(74) *Attorney, Agent, or Firm* — Carr & Ferrell LLP

(57) ABSTRACT

Systems and methods for providing personalized reversed 911 services are provided. In accordance with exemplary embodiments, a 911 call indication is received. This 911 call indication triggers a review of at least one reverse 911 profile associated with media gateway device initiating the 911 call. One or more call treatments to be performed based on the reverse 911 profiles are determined. Instructions for performing the one or more call treatments may then be generated and forwarded to one or more appropriate components.

20 Claims, 5 Drawing Sheets

(56) References Cited

U.S. PATENT DOCUMENTS

| | | |
|---|---|---|
| 2006/0007915 A1 | 1/2006 | Frame |
| 2006/0013195 A1 | 1/2006 | Son et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0251048 A1 | 11/2006 | Yoshino et al. |
| 2006/0258341 A1 | 11/2006 | Miller et al. |
| 2007/0037560 A1 | 2/2007 | Yun et al. |
| 2007/0121593 A1 | 5/2007 | Vance et al. |
| 2007/0133757 A1 | 6/2007 | Girouard et al. |
| 2007/0153776 A1 | 7/2007 | Joseph et al. |
| 2007/0183407 A1 | 8/2007 | Bennett et al. |
| 2007/0203999 A1 | 8/2007 | Townsley et al. |
| 2007/0283430 A1 | 12/2007 | Lai et al. |
| 2008/0075248 A1 | 3/2008 | Kim |
| 2008/0084975 A1 | 4/2008 | Schwartz |
| 2008/0111765 A1 | 5/2008 | Kim |
| 2008/0125095 A1 | 5/2008 | Mornhineway et al. |
| 2008/0144625 A1 | 6/2008 | Wu et al. |
| 2008/0159515 A1 | 7/2008 | Rines |
| 2008/0225749 A1 | 9/2008 | Peng et al. |
| 2008/0247401 A1 | 10/2008 | Bhal et al. |
| 2008/0298348 A1 | 12/2008 | Frame et al. |
| 2008/0313297 A1 | 12/2008 | Heron et al. |
| 2008/0316946 A1 | 12/2008 | Capper et al. |
| 2009/0135008 A1* | 5/2009 | Kirchmeier et al. .......... 340/540 |
| 2009/0168755 A1 | 7/2009 | Peng et al. |
| 2009/0253428 A1 | 10/2009 | Bhatia et al. |
| 2010/0046530 A1 | 2/2010 | Hautakorpi et al. |
| 2010/0046731 A1 | 2/2010 | Gisby et al. |
| 2010/0098235 A1 | 4/2010 | Cadiz et al. |
| 2010/0136982 A1 | 6/2010 | Zabawskyj et al. |

* cited by examiner

SYSTEM AND METHOD FOR PROVIDING PERSONALIZED REVERSE 911 SERVICE

BACKGROUND OF THE INVENTION

1. Field of the Invention

This invention relates generally to Voice over Internet Protocol (VoIP) technology, and more particularly to providing personalized reverse 911 service.

2. Description of the Background Art

Conventionally, simplified reverse 911 service is provided by government agencies such as a local police or fire departments. In these simplified reverse 911 services, the agency maintains a listing of phone numbers for a specific area (e.g., neighborhood) which may be contacted in case of an emergency in the area. For example, if a brush fire is spreading in a particular area, authorities may call all homes in the area to notify people to evacuate or otherwise provide useful information. Disadvantageously, the simplified reverse 911 service is directed to contacting a large number of individuals in an emergency and providing general information.

More recently, a few agencies are enabling a system whereby individuals may provide a contact list in case of emergencies. Thus, if an elderly individual calls the police, the police will notify a designated person from the contact list. While this new system allows some personalization, the process is tedious. For example, the elderly individual needs to contact the local agency and provide the contact list. This contact list is then manually entered into a system of the local agency. During the emergency, an individual associated with the local agency must complete the emergency call (e.g., from the elderly individual) before reviewing the contact list, and manually initiating a call to the designated person. Furthermore, the individual then must remain on the call to provide information regarding the emergency to the designated person. Disadvantageously, this system is prone to human error and is inefficient. For example, the local agency may not have the personnel to initiate the call to the designated person or the contact list may be manually entered incorrectly. A further disadvantage is that only voice messages may be conveyed during these calls. Additional information or data such as video or telemetry cannot be provided.

SUMMARY OF THE INVENTION

Systems and methods for providing personalized reversed 911 services are provided. In accordance with exemplary embodiments, a 911 call indication is received. In some embodiments, a media gateway device may automatically scan all dialing instructions to detect 911 connection instructions or other 911 triggers. Accordingly, this 911 indication may trigger the media gateway device to provide the personalized reverse 911 service. In other embodiments, the 911 indication may be sent to a VoIP provider system to activate the personalized reverse 911 service process at the VoIP provider system. In one embodiment, the media gateway device comprises an analog telephone adapter (ATA).

Accordingly, a review of a reverse 911 profile associated with the media gateway device initiating the 911 call is performed. The profile may comprise a list of call treatments which indicate one or more user-defined phone numbers and methods of communicating with the user-defined phone numbers (e.g., designated communication devices). In one embodiment, the designated communication device may be sent a message—audio or text (e.g., SMS message, MSM message, prerecorded message). The message may also include attached data such as a photograph from a security camera or status information from an alarm system. The message may also comprise a recording of the 911 call or telemetry. In another embodiment, the designated communication device may be bridged into a real-time 911 call. A user at the bridged designated communication device may be allowed to participate in the 911 call (e.g., conference in) or allowed to monitor the 911 call (e.g., listen but not be heard).

Instructions for performing the one or more call treatments may then be generated and forwarded to one or more appropriate components for performing the call treatment. In some embodiments, the instructions may be performed by the media gateway device initiating the 911 call. In other embodiments, the instructions may be performed by the VoIP provider system alone, in conjunction with the media gateway device initiating the 911 call, and/or in conjunction with a media gateway device associated with the designated communication device.

DETAILED DESCRIPTION OF EXEMPLARY EMBODIMENTS

Embodiments of the present invention are directed to providing personalized reverse 911 service. In exemplary embodiments, a reverse 911 profile may be established. The profile may comprise a list of one or more call treatments to be automatically performed when a 911 call is made. Each call treatment may comprise at least one user-defined phone number (or other communication identifier) of a designated communication device and a method of communication with the user-defined phone number. These methods of communication may include, for example, providing notification to one or more designated communication devices, bridging a call from the designated communication device to a live 911 call such that the user at the designated communication device may participate in the 911 call, or allowing the user at the designated communication device to monitor the 911 call.

Figure 1:
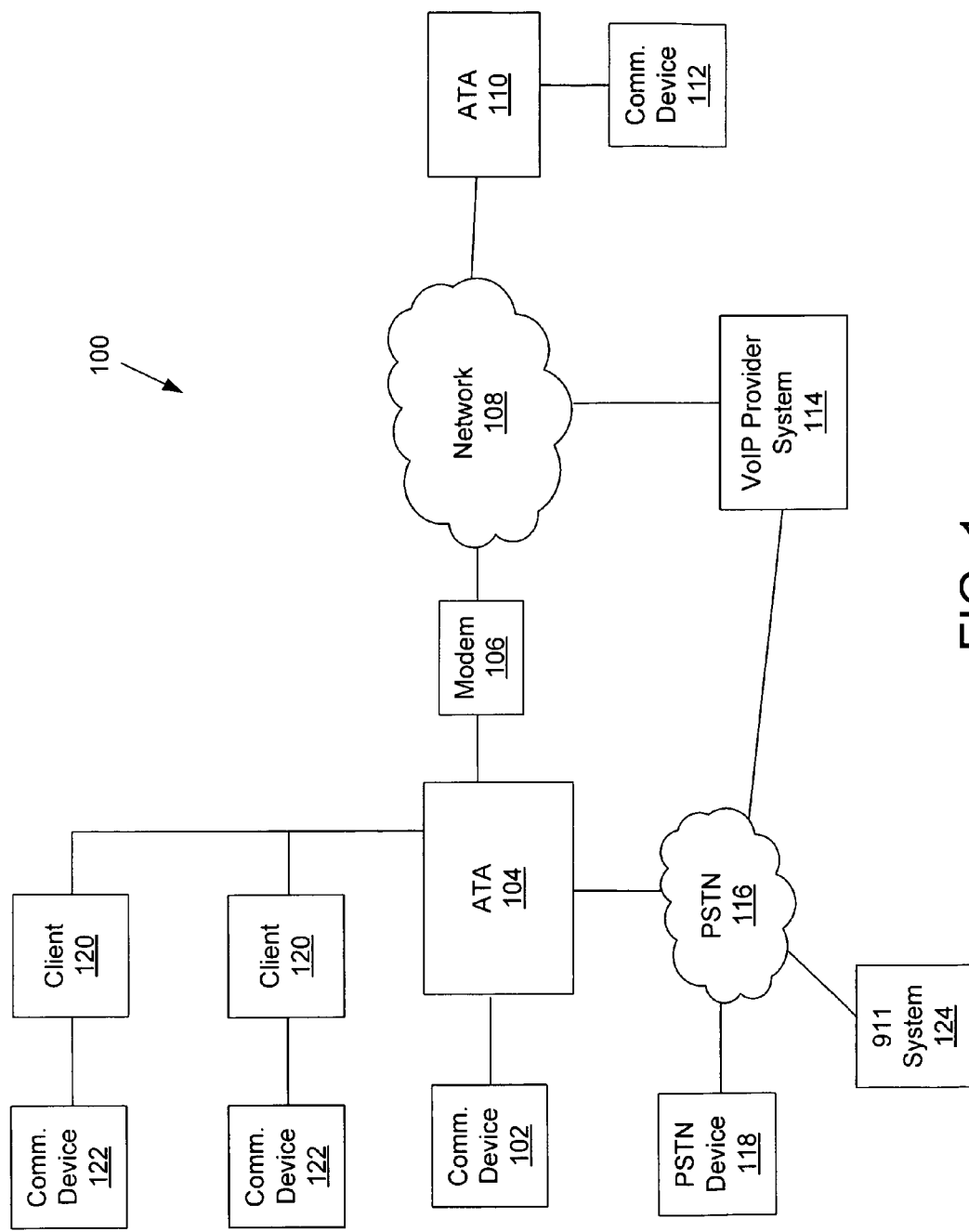
FIG. 1 is an exemplary block diagram illustrating an environment in which embodiments of the present invention may be practiced.

FIG. 1 illustrates an exemplary environment 100 in which embodiments of the present invention may be practiced. In exemplary embodiments, a Voice over Internet Protocol (VoIP) user may utilize a communication device 102 to initiate a communication. In one embodiment, the user will provide dialing instructions (e.g., enter a phone number) into the communication device 102. The communication device 102 may be coupled to an analog telephone adapter (ATA) 104. In exemplary embodiments, the ATA 104 may convert analog signals from the communication device 102 into packets using a voice codec (coder/decoder) algorithm. The packets may then be provided via a modem 106 through a broadband network connection to a network 108. In exemplary embodiments, the network 108 may comprise the Internet, wide area network (WAN), or any other communications network.

The ATA 104 may comprise a media gateway device which serves as an interface between an analog communication device (e.g., communication device 102) and a packet-based network 108. In various embodiments, the ATA 104 may comprise a stand-alone device or may be incorporated into another device such as a cordless phone base station or broadband modem (e.g., the modem 106). In alternative embodiments, other media gateway devices may be contemplated (e.g., SIP phone, DECT handset).

A VoIP call may then be routed to a destination ATA 110 associated with a destination communication device 112 (associated with the dialing instructions). In exemplary embodiments, the destination ATA 110 places the packets into a buffer and uses the same codec algorithm to convert the packets back into analog signals, which are then forwarded to the destination communication device 112. In an alternative embodiment, the VoIP call may be routed to a destination communication device 112 directly, without the use of an ATA (e.g., SMS message).

In some embodiments, the VoIP call may be routed via a VoIP provider system 114 to the destination ATA 110. The exemplary VoIP provider system 114 may be configured to select an appropriate destination ATA (e.g., ATA 110) in a same local calling area as a destination communication device 112 from among many such ATAs based upon a phone number or other identifier of the destination communication device 112. The VoIP provider system 114 may be further configured to verify availability of the destination ATA 110 using a signaling message and communicate routing information from the destination ATA 110 to the initiating ATA (e.g., ATA 104).

The ATA 104 can optionally be coupled to a land-line interface through a foreign exchange office (FXO) port to carry calls through a PSTN 116 to a Public Switched Telephone Network (PSTN) device 118. The PSTN 116 may comprise any level of the global PSTN (e.g., local transport network, regional transport network, international transport network). Alternatively, calls may be routed to the PSTN device 118 via the network 108 using session initiation protocol (SIP) through an Internet telephony service provider (ITSP) or the VoIP provider system 114 which couples the call through a PSTN connection to the PSTN device 118.

In some embodiments, the ATA 104 may provide a local area network connection to one or more client devices 120. The ATA 104 and client devices 120 can each provide FXS channels for locally connected communication devices 122. In exemplary embodiments, the communication devices 102 and 122 may comprise telephones, answering machines, cordless phones, fax machines, modems, SIP phones, DECT handsets, or other communication equipment.

The communication device 102 may also receive inbound communications. In exemplary embodiments, inbound communications directed to the communication device 102 associated with the ATA 104 can originate from various sources. First, if the call is from the PSTN device 118, then the inbound communication can arrive at the ATA 104 via the PSTN 116 and land-line. Alternatively, the inbound communication from the PSTN device 118 may be routed through the network 108 by an ITSP or the VoIP provider system 114. In another embodiment, if the inbound communication originates from another subscriber to VoIP service, then the inbound communication may be routed through the network 108 and/or the VoIP provider system 114.

In accordance with exemplary embodiments, communications may be initiated to a 911 system 124, which may trigger one or more personalized reverse 911 services. In various embodiments, the personalized reverse 911 service may comprise call treatments including, but not limited to, sending a notification or message to one or more designated communication devices, allowing a user at a designated communication device to monitor the 911 call, and conferencing a designated communication device into the 911 call. The designated communication device may comprise the destination communication device 112. It should be noted that the designated communication device need not be coupled to an ATA (e.g., ATA 110) to receive the call treatment. The personalized reverse 911 service may be performed by the ATA 104 or similarly configured media gateway devices according to exemplary embodiments. This intelligent ATA 104 will be discussed in more detail in connection with FIG. 2. Alternatively, the personalized reverse 911 service may be provided by a combination of the ATA 104 and the VoIP provider system 114. In this alternative embodiment, a standard ATA 104 works in conjunction with the VoIP provider system 114 described in more detail in connection with FIG. 4 below.

Figure 2:
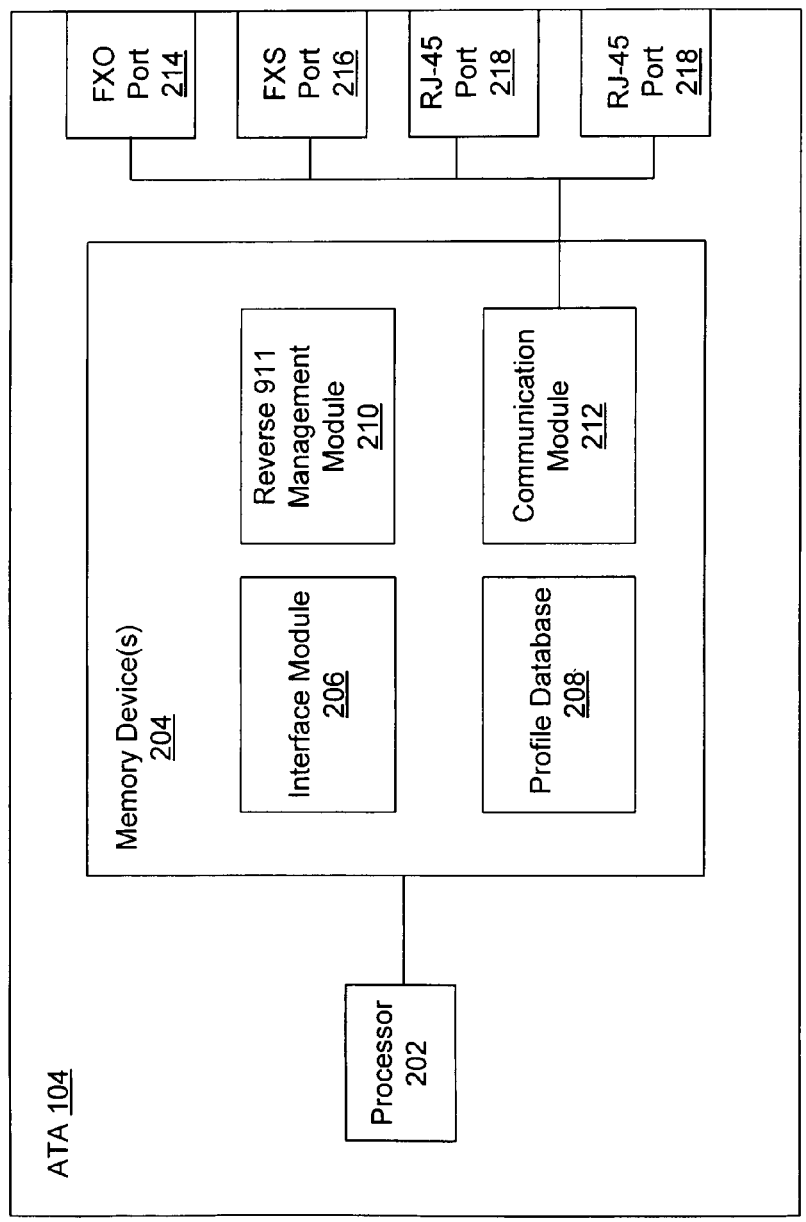
FIG. 2 is an exemplary block diagram of an ATA.

Referring to FIG. 2, the exemplary intelligent ATA 104 is shown in more detail. In exemplary embodiments, the ATA 104 comprises a processor 202 coupled to one or more memory devices 204. In some embodiments, the processor 202 may be configured to perform audio compression and decompression, echo cancellation, and audio mixing. The memory device 204 may comprise storage for a plurality of applications, components, and modules. In the present embodiment, the memory device 204 comprises an interface module 206, a profile database 208, a reverse 911 management module 210, and a communication module 212.

The exemplary interface module 206 is configured to receive call treatment instructions and store the call treatment instructions in one or more profiles in the profile database 208. In some embodiments, a user may provide call treatment instructions via the network 108 (e.g., provide the call treatment instructions via a website) which is forwarded to the interface module 206. In other embodiments, an input device may be provided on or associated with the ATA 104 for directly entering the profile information.

In exemplary embodiments, the one or more profiles stored in the profile database 208 comprise a list of one or more call treatments. The call treatments may identify one or more designated communication devices via user-defined phone numbers or other identifiers (e.g., e-mail address) and corresponding communication methods. In one embodiment, the designated communication device may be sent a message including audio and/or text (e.g., SMS message, MSM message, prerecorded message). The message may also include attached data such as a photograph from a security camera or status information from an alarm system. Alternatively or in addition, the message may comprise a recording of the 911 call or telemetry (e.g., indication of type of medical emergency or temperature in a house). In another embodiment, the designated communication device may be conferenced into a real-time 911 call. In yet another embodiment, a user at the designated communication device may be allowed to monitor the 911 call (e.g., listen but not be heard). It should be noted that more than one designated communication device and more than one call treatment may be preformed for an instance of a 911 call. Furthermore, each of these designated communication devices may be contacted using a different call treatment (e.g., one communication device may be sent a SMS message, while a second communication device is bridged into the 911 call).

The exemplary reverse 911 management module 210 is configured to trigger the reverse 911 service. In one embodiment, the reverse 911 management module 210 may scan a dialed number to detect if 911 has been dialed. Alternatively, a separate module of the ATA 104, a hub device, or other in-home system (e.g., security system) may scan for 911 connection instructions and notify the reverse 911 management module 210 when the 911 connection instructions are detected. In yet another embodiment, the connection instructions may comprise a network or SIP packet from, for example, an alarm system, to indicate that a call to 911 should be initiated. Once detected, the reverse 911 management module 210 may access the profile database and determine one or more call treatments to be performed. Instructions may then be provided to the communication module 212 to execute the call treatment.

The exemplary communication module 212 may perform the call treatment as directed by the instructions from the reverse 911 management module 210. In exemplary embodiments, the communication module 212 may trigger communication with the designated communication device. For example, the designated communication device may be provided a message from the communication module 212. In some embodiments, the message may be a text message or an audio message. Additional data (e.g., photo, video, status information) may also be attached to the message. The message may also comprise a recording of the 911 call or telemetry (e.g., indication of a heart attack or temperature in a house). In other embodiments, the designated communication device may be bridged into a real-time 911 call whereby the user at the designated communication device may participate in the real-time 911 call or be allowed to monitor the real-time 911 call.

The ATA 104 may also comprise hardware components that enable the functionality of the ATA 104. These exemplary components may comprise one or more FXO ports 214, FXS ports 216, and RJ-45 ports 218. The FXO port 214 is configured to interface to the PSTN 116, while the FXS port 216 is configured to interface to an analog phone (e.g., communication device 102). In one embodiment, the FXS port 216 may interface to a plurality of analog phones such that the ATA 104 may interface, for example, to all communication devices 102 in a particular area (e.g., house). A first RJ-45 port 218 may provide a WAN (e.g., Ethernet) interface to network 108 via the modem 106, while a second RJ-45 port 218 may be optionally provided for a local area (LAN) interface to, for example, a personal computing device, router, and/or hub.

In alternative embodiments, other media gateway devices may perform the functions described above with regards to the ATA 104. These alternative media gateway devices, such as a SIP phone or DECT handset, may comprise similar or equivalent modules (e.g., interface module 206, profile database 208, reverse 911 management module 210, and communication module 212) according to various embodiments.

Figure 3:
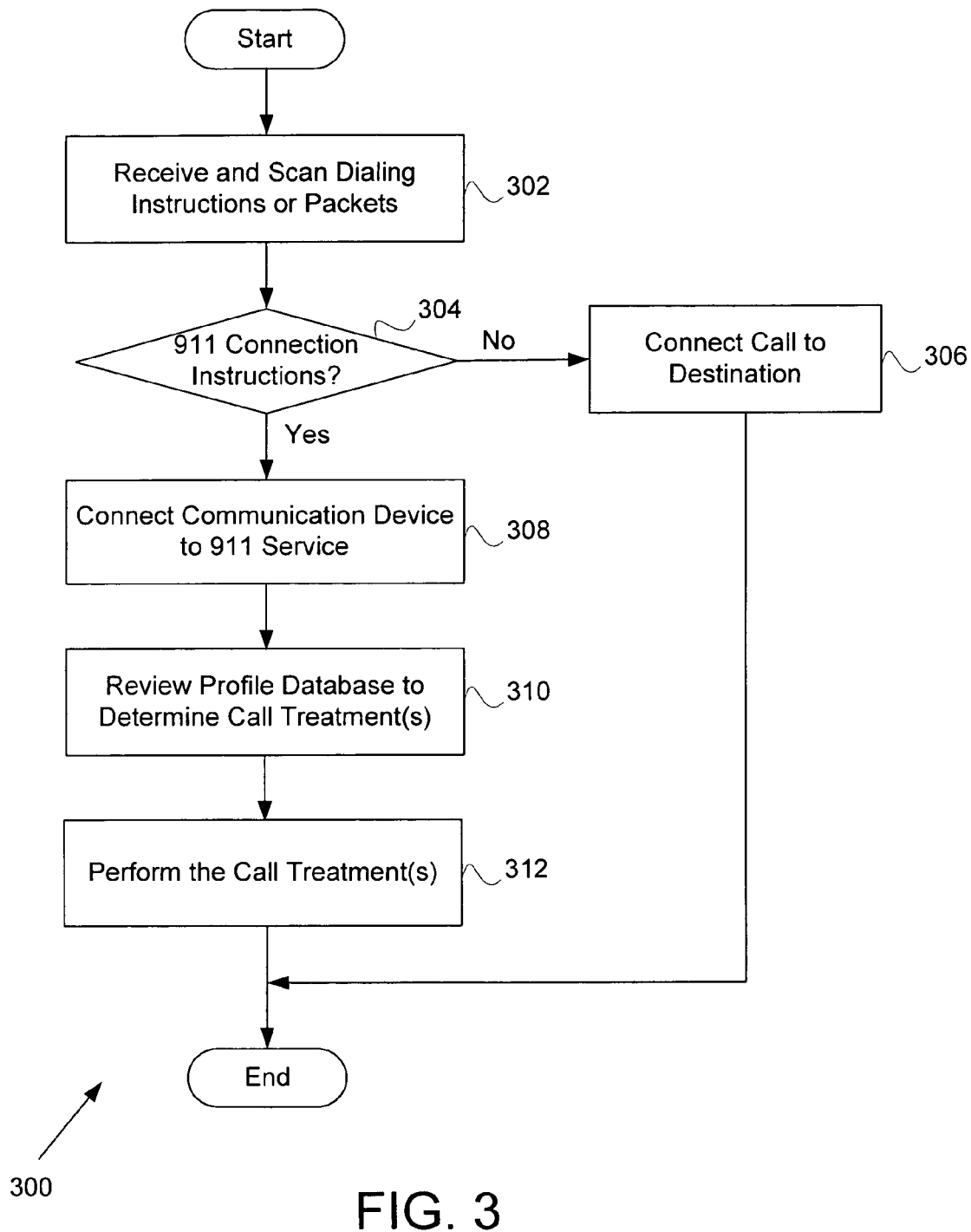
FIG. 3 is a flowchart of an exemplary method for processing a 911 call and providing personalized reverse 911 service at the ATA.

Referring now to FIG. 3, a flowchart 300 of an exemplary method for providing personalized reverse 911 service at the ATA 104 or similarly configured media gateway devices is provided. In step 302, the ATA 104 scans received dialing instructions or packets. In some embodiments, a user may enter dialing instructions (e.g., a phone number) into their communication device 102. The dialing instructions are then routed to the ATA 104. In an alternative embodiment, an alarm system or other device may send a network or SIP packet through the ATA 104 which indicates a need to call the 911 system 124.

A determination is made as to whether the dialing instructions or packets comprise 911 connection instructions in step 304. In exemplary embodiments, the reverse 911 management module 210 is configured to detect if a 911 call is being initiated. In other embodiments, an alternative module or component of the ATA 104, hub, or in-home system (e.g., alarm system) may perform the monitoring. If the dialing instruction or packets do not comprise 911 connection instructions, then the call is made to a destination communication device based on the reviewed dialing instructions or packets in step 306.

However, if 911 connection instructions are received (e.g., a 911 call indication), then the ATA 104 may couple the communication device 102 to the 911 system 124 in step 308. In one embodiment, the ATA 104 may forward the call via the FXO port 214 to the PSTN 116. The call may then be connected to the 911 system 124 via the PSTN 116. In other embodiments, the 911 call may be carried through the VoIP provider system 114. These embodiments may occur when the user does not have a PSTN connection to the ATA 104.

In step 310, the detection of the 911 connection instructions triggers a review of one or more profiles in the profile database. In exemplary embodiments, the reverse 911 management module 210 may access the profile database 416. Each profile may provide a listing of one or more call treatments and designated communication devices. In various embodiments, the call treatment may comprise sending a message to one or more designated communication devices (e.g., SMS message to a mobile phone), conferencing one or more designated communication devices into a real-time 911 call, and/or allowing a user at the designated communication device to monitor the 911 call. Other call treatments, not listed, may be utilized. The call treatment(s) are then performed in step 312.

In one embodiment, a user at the communication device 102 may be presently on a call with a destination communication device (e.g., communication device 112) when a 911 call is needed. Instead of having either user disconnect from the present call, one of the users may dial a special 911 code (e.g., 911). This special 911 code may be recognized by the ATA 104 and may trigger the connection to the 911 system 124 in step 308. Subsequently, the ATA 104 may then review the profile database to determine call treatments (step 310) and perform the call treatments (step 312). In another embodiment, if a user is already on a call with a destination device, and a second user associated with the same ATA 104 (i.e., in the same location) dials 911, the ATA 104 may maintain both calls. Furthermore, the two users at the same location may be conferenced together. In one embodiment, one of the two users may select one or more buttons on the ATA 104** or their respect communication device to conference the two calls together.

It should be noted that the method of FIG. 3 is exemplary. Alternative embodiments may contemplate more, less, or combined steps and still be within the scope of exemplary embodiments. Furthermore, the orders of some steps may be changed. For example, step 308 may be performed substantially concurrently with, or after, steps 310-312.

Figure 4:
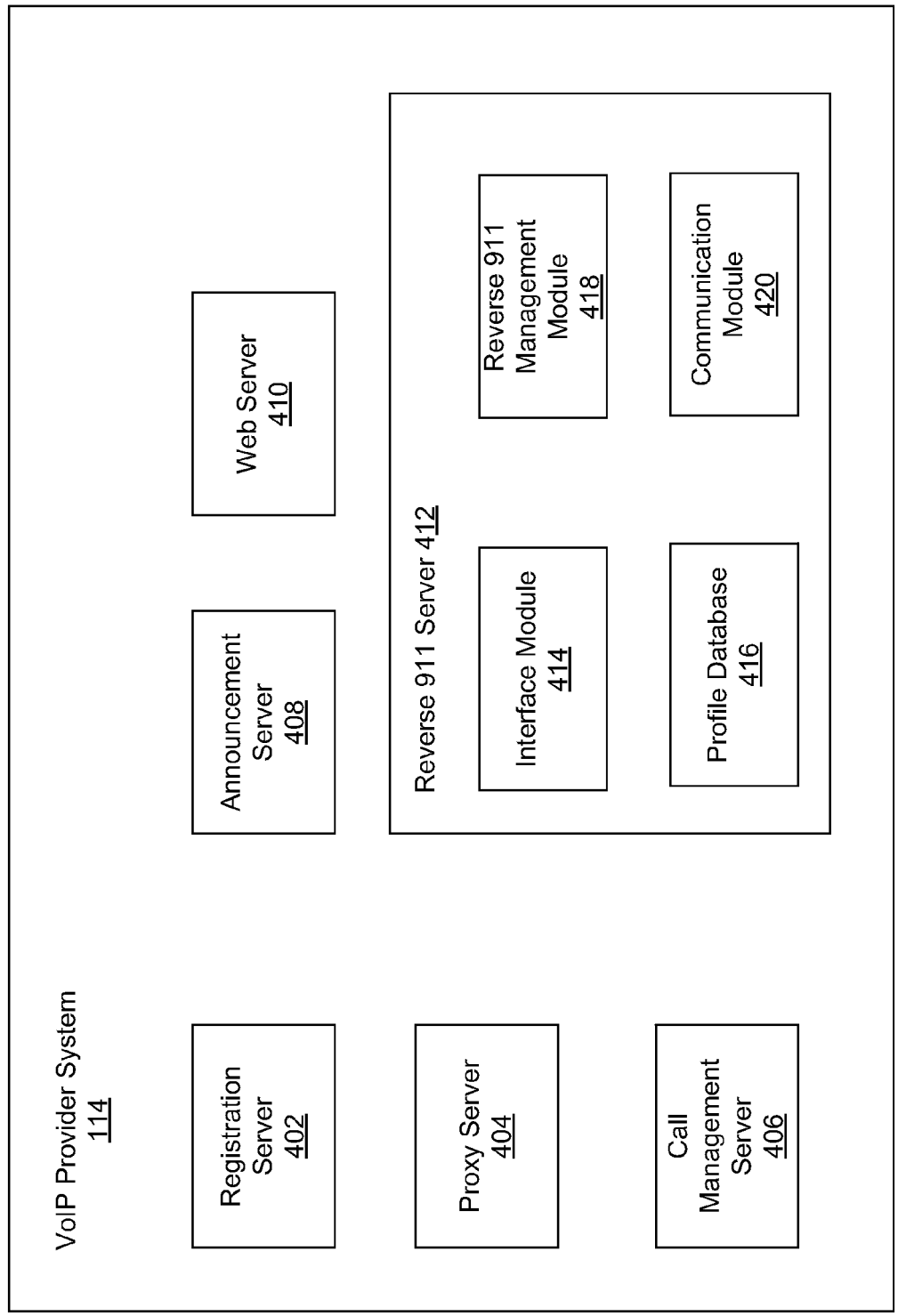
FIG. 4 is an exemplary block diagram of a VoIP service provider, according to an alternative embodiment.

Referring now to FIG. 4, the VoIP provider system 114 is shown in more detail. In an alternative implementation of the present invention, the personalized reverse 911 service may be implemented by the VoIP provider system 114. In these embodiments, the ATA 104 or media gateway device may comprise a less intelligent ATA or media gateway device (e.g., does not comprise a profile database 208 or reverse 911 management module 210). As a result, the determination of the call treatments may occur at the VoIP provider system 114. In some embodiments, the VoIP provider system 114 may perform the call treatment. In other embodiments, the VoIP provider system 114 may send instructions to an ATA (e.g., 911 calling ATA or designated communication device ATA) or media gateway device to perform the call treatment. While exemplary embodiments of FIGS. 4 and 5 will be discussed with respect to the ATA 104, it should be noted that embodiments of the present invention may be applied to any media gateway device.

In exemplary embodiments, the VoIP provider system 114 may comprise a registration server 402, proxy server 404, call management server 406, an announcement server 408, a web server 410, and a reverse 911 server 412. In some embodiments, the reverse 911 server 412 may be embodied within a feature server (e.g., providing advanced call features including standard session initiation protocol (SIP) features and custom-developed features such as, teleconferencing services, call-forwarding, 3-way calling, and call waiting).

It should be noted that the VoIP provider system 114 may comprise other servers, which may not be involved in the personalized reversed 911 services but may be needed to perform the functions of the VoIP system 114. Furthermore, although the embodiment of FIG. 4 illustrates individual servers 402-412, it will be appreciated that the servers 402-412 can be combined or distributed in various manners. For example the servers 402-412 may be implemented in a decentralized peer-to-peer network rather than in a client-server configuration. In another example, the servers 402-412 may be combined within a single server and comprise modules performing the functions of each individual server 402-412. It should also be appreciated that the servers 402-412 may comprise any combination of hardware and software elements.

The registration server 402 may be configured to register ATAs coupled to the network 108. In exemplary embodiments, the registration server 402 registers information from each ATA. The information may comprise ATA identification, event notifications, and periodic updates. For example, the registration server 402 may receive asynchronous event notifications from the ATA 104 after the ATA 104 changes from an idle state to an in use state or vice-versa.

The exemplary proxy server 404 may be configured to communicate signaling messages with ATAs across the network 108. In exemplary embodiments, call routing between ATAs may be enabled by the proxy server 404. Accordingly, the proxy server 404 may issue a request for call routing information from the call management server 406. As such, the exemplary call manager server 406 may be configured to determine appropriate call routing. In some embodiments, the call manager server 406 may determine the call routing instructions based on a review of a routing database. In one embodiment, routing logic of the call management server 406 may be decentralized among a number of servers or processors (not shown).

The exemplary announcement server 408 may provide prerecorded announcements or messages. In one embodiment, the announcement server 408 may provide one or more sound files, such as ".wav" files, stored in an associated announcement database (not shown). For example the announcement server 408 may provide a .wav file indicating that a call cannot be completed as dialed for a phone call that cannot be placed. While .wav files are discussed, it should be noted that any type of audio may be utilized, such as, for example, synthesized speech.

The exemplary web server 410 is configured to provide a graphical user interface for a user to interface with the various servers 402-412 of the VoIP provider system 114. For example, the user may access a webpage associated with the VoIP provider system 114 and request customer support, provide registration information, or receive billing information.

The exemplary reverse 911 server 412 is configured to initiate and/or provide the personalized reverse 911 service.

In accordance with one embodiment, when a 911 call indication from the ATA 104 is received by the registration server 402, the reverse 911 server 412 may access a profile associated with the ATA 104. Based on the profile, the reverse 911 server 412 may determine one or more call treatments to be performed. The reverse 911 server 412 may then trigger the performance of the call treatment. In one embodiment, the reverse 911 server 412 may be embodied within a feature server (not shown) which provides advanced calling features. The exemplary reverse 911 server 412 may comprise an interface module 414, a profile database 416, a reverse 911 management module 418, and a communication module 420.

The exemplary interface module 414 is configured to receive call treatment instructions and store the call treatment instructions in a profile in the profile database 416. The profile database 416 may comprise any number of profiles (e.g., one profile per ATA). In some embodiments, a user may provide profile information via the network 108 (e.g., provide the call treatment instructions via a website) which is forwarded to the interface module 414. In other embodiments, the web server 410 may perform the functions of the interface module 414. For example, a user may provide call treatment instructions via the network 108 (e.g., provide the call treatment instructions via a website) which is reviewed by the web server 410.

In exemplary embodiments, the profiles stored in the profile database 416 comprise a list of one or more call treatments (e.g., user-defined phone numbers of designated communication devices and corresponding communication methods). In one embodiment, the call treatment may comprise sending a message—audio or text (e.g., SMS message, MSM message, prerecorded message) to the designated communication device. The message may also include attached data such as a photograph from a security camera or status information from an alarm system. The message may also comprise a recording of the 911 call or telemetry. In another embodiment, the call treatment may conference the designated communication device into a real-time 911 call. In yet another embodiment, the call treatment may allow a user at the designated communication device to monitor the 911 call (e.g., listen but not be heard).

It should be noted that more than one designated communication device and more than one call treatment may be preformed for an instance of a 911 call. Furthermore, each of these designated communication devices may be contacted using a different call treatment (e.g., one communication device may be sent a SMS message, while a second communication device is bridged into the 911 call). In alternative embodiments, the profile may be stored in a database (e.g., a database comprising ATA registration information and/or routing tables) located elsewhere in the VoIP provider system 114.

In some embodiments, different profiles or call treatments may be established for different conditions. One such condition may be the time of day. For example, if a 911 call indication is received at 10 am, then a morning profile or call treatment may be used, whereas if the 911 call indication is received at 7 pm, an evening profile or call treatment may be used. Other conditions may comprise, for example, status of an alarm system or an on-vacation setting.

The exemplary reverse 911 management module 418 may be configured to trigger the reverse 911 service. In one embodiment, the reverse 911 management module 418 may receive a 911 call indication from the initiating ATA (e.g., ATA 104). Alternatively, the registration server 402 may receive the 911 call indication via, for example, an event notification message. Once detected, the reverse 911 management module 418 may access the profile database 416 and determine one or more call treatments to be performed. Instructions may then be provided to the communication module 420.

The exemplary communication module 420 may perform, or trigger performance of, the instructions (e.g., the call treatment as directed by the instructions from the reverse 911 management module 418). In exemplary embodiments, the communication module 420 may trigger communication with the designated communication device from the VoIP provider system 114. For example, the designated communication device may be provided a message from the communication module 420. In some embodiment, the message may be a text message or an audio message. Additional data (e.g., photo, video, status information) may also be attached to the message. In other embodiments, the communication with the designated communication device may comprise conferencing of the designated communication device into a real-time 911 call, or allowing a user at the designated communication device to monitor the real-time 911 call. In an alternative embodiment, the announcement server 408 may receive instructions to provide an audio message (e.g., a .wav file announcing "911 has been called from your home").

In alternative embodiments, the call treatment may be performed by servers or modules located outside of the reverse 911 server 412 either alone or in conjunction with the ATAs. For example, the designated communication device may be provided a message from the announcement server 408. Alternatively, instructions may be sent to the ATA 104 to provide the message. In other embodiments, the call management server 406 may provide routing instructions to the proxy server 404 (e.g., to provide to the 911 calling ATA) to conference the designated communication device into a real-time 911 call or allow a user at the designated communication device to monitor the real-time 911 call. In alternative embodiments, the routing instructions may instruct an ATA associated with the designated communication device to initiate a call into the ATA 104 associated with the 911 call, thus allowing conferencing or monitoring of the 911 call by the designated communication device.

Figure 5:
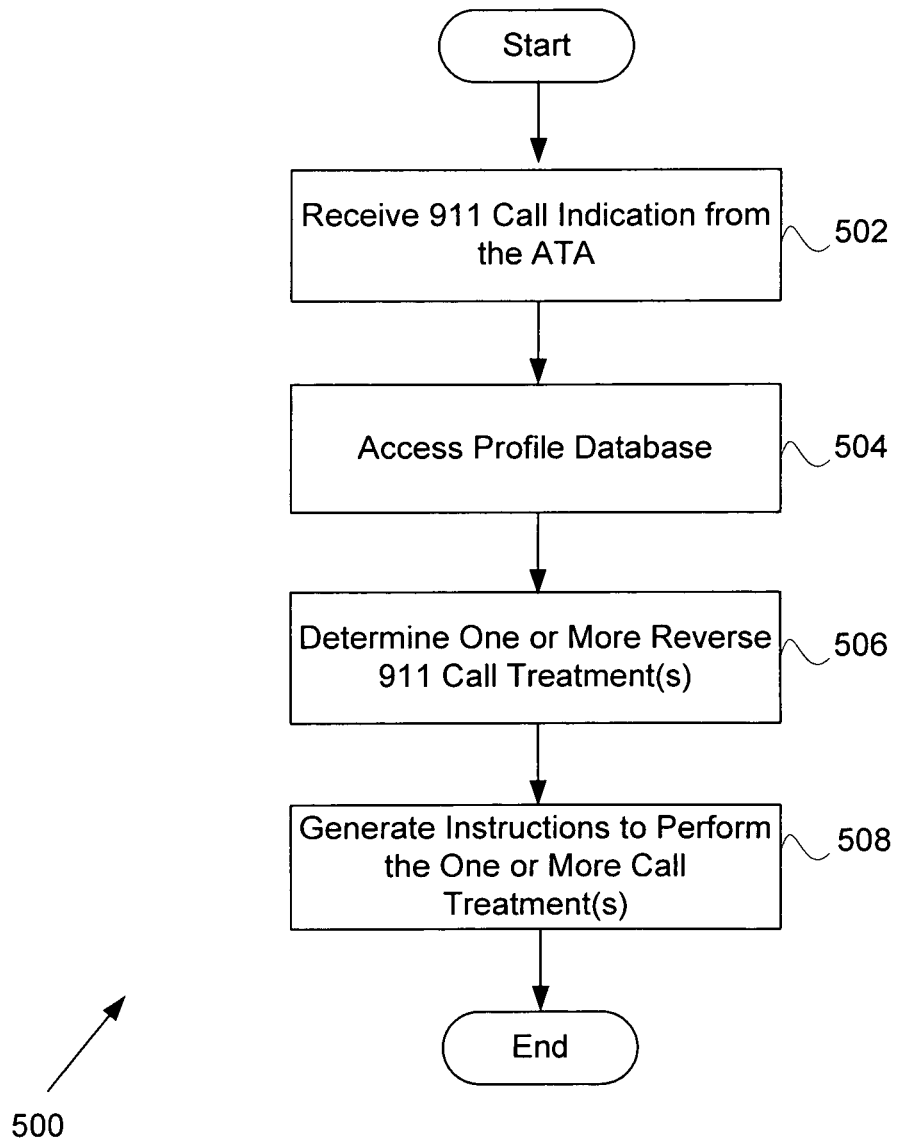
FIG. 5 is a flowchart of an exemplary method for providing personalized reverse 911 service at a VoIP service provider

Referring now to FIG. 5, a flowchart 500 of an alternative method for providing personalized reverse 911 service is shown. In this embodiment, the personalized reverse 911 service if triggered from the VoIP provider system 114. Thus, the determination of the call treatment originates from the VoIP provider system 114 in this embodiment. The call treatments, themselves, may be performed by the VoIP provider system 114, the ATA (e.g., ATA 104) associated with the 911 call, and/or the ATA associated with a designated communication device.

In step 502, a 911 call indication is received from the ATA 104 connecting the communication device 102 to the 911 system 124. In some embodiments, the ATA 104 may scan dialing instructions to determine if 911 connection instructions for communicating with the 911 system 124 are received. In other embodiments, the ATA 104 may scan for network or SIP packets that may indicate a need to connect to the 911 system 124 (i.e., 911 connection instructions). If 911 connection instructions are received, then the ATA 104 may forward the 911 call indication to the VoIP provider system 114. In one embodiment, the 911 call indication is received by the registration server 402. In another embodiment, the 911 call indication may be received by the reverse 911 management module 418.

The receipt of the 911 call indication may trigger access of the profile database 416 in step 504. According to one embodiment, the reverse 911 management module 418 will review one or more profiles associated with the 911 calling ATA 104. Each profile may comprise a list of one or more call treatments (e.g., rules for contacting one or more designated communication device and their associated contact identifiers). In exemplary embodiments, the call treatments may comprise sending a message to the designated communication device(s), conferencing designated communication device(s) into a real-time 911 call, and/or allowing users at the designated communication device(s) to monitor the 911 call (e.g., listen but not be heard). It should be noted that more than one call treatment may be preformed for an instance of a 911 call. Furthermore, each of the designated communication device may be contacted using a different method of communication (e.g., one communication device may be sent a SMS message, while a second communication device is bridged into the 911 call).

The profiles may then be reviewed to determine the one or more 911 call treatments in step 506. Once determined, instructions may be generated to perform the one or more call treatments in step 508. In some embodiments, the instructions may be performed by components of the VoIP provider system 114. For example, the communication module 420 may trigger communication with the designated communication device and provide a message. In some embodiment, the message may be a text message or an audio message. In other embodiments, the message may comprise a recording of the 911 call or telemetry. Additional data (e.g., photo, video, status information) may also be attached to the message.

In other embodiments, the instructions may trigger components of the VoIP provider system 114 to initiate a communication process with one or more ATAs. For examples, instructions may be sent to the 911 calling ATA 104 to conference the designated communication device into a real-time 911 call or allow a user at the designated communication device to monitor the real-time 911 call. In these examples, the 911 calling ATA 104 may then couple to the ATA associated with the designated communication device.

The above-described modules can be comprised of instructions that are stored on storage media. The instructions can be retrieved and executed by the processor. Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. For example, any media gateway device may perform the functions as described with respect to the ATA 104. Therefore, these and other variations upon the exemplary embodiments are intended to be covered by the present invention.

The invention claimed is:

1. A method for providing personalized reverse 911 services, comprising:
   receiving a 911 call indication, the 911 call indication based at least in part on a determination that 911 has been dialed via a communication device;
   connecting the communications device to a 911 service over a communications network via an analog telephone adapter (ATA), the ATA being interposed between the communications device and the communications network;

reviewing a reverse 911 profile associated with the ATA initiating the 911 call;
determining one or more call treatments to be performed based on the reverse 911 profile; and
providing instructions for performing the one or more call treatments.

2. The method of claim 1 wherein determining one or more call treatments comprises determining at least one designated communication device to contact regarding the 911 call.

3. The method of claim 1 wherein the one or more call treatments comprises sending a message to at least one designated communication device.

4. The method of claim 3 wherein the message comprises a SMS message.

5. The method of claim 3 wherein the message comprises an audio message.

6. The method of claim 3 wherein the message comprises a recording of the 911 call.

7. The method of claim 3 wherein the message comprises telemetry.

8. The method of claim 3 wherein the message comprises attached data.

9. The method of claim 8 wherein the attached data comprises a snapshot from a home security camera.

10. The method of claim 8 wherein the attached data comprises a status report from an alarm system.

11. The method of claim 1 wherein the one or more call treatments comprises conferencing a designated communication device into the 911 call.

12. The method of claim 11 wherein the conferencing allows the designated communication device to monitor the 911 call.

13. The method of claim 1 further comprising performing the one or more call treatments based on the instructions.

14. The method of claim 1 further comprising receiving rules to personalize the reverse 911 profile.

15. An analog telephone adapter (ATA) for providing personalized reverse 911 service, comprising:
a profile database containing at least one reverse 911 profile, the reverse 911 profile comprising one or more call treatments;
a reverse 911 management module configured to determine that 911 has been dialed via a communication device and review the reverse 911 profile to determine the one or more call treatments to be performed based on the reverse 911 profile; and
a communication module configured to connect the communications device to a 911 service via a communications network and provide instructions for performing the one or more call treatments, the ATA being interposed between the communications device and a communications network.

16. The ATA of claim 15 further comprising an interface module configured to allow customization of the reverse 911 profile.

17. The ATA of claim 16 wherein the interface module is includes a web server.

18. A non-transitory machine readable medium having embodied thereon a program, the program being executable by a processor to perform a method for personalized reverse 911 services, the method comprising:
receiving a 911 call indication, the 911 call based at least in part on a determination that 911 has been dialed via a communication device;
connecting the communications device to a 911 service over a communications network via an analog telephone adapter (ATA), the ATA being interposed between the communications device and the communications network;
reviewing a reverse 911 profile associated the ATA initiating the 911 call;
determining one or more call treatments to be performed based on the reverse 911 profile; and
providing instructions for performing the one or more call treatments.

19. The non-transitory machine readable medium of claim 18 wherein determining one or more call treatments comprises determining at least one designated communication device to contact regarding the 911 call.

20. The non-transitory machine readable medium of claim 18 wherein the one or more call treatments comprises sending a message to at least one designated communication device.

* * * * *